US006487358B1

(12) United States Patent
Gehrke et al.

(10) Patent No.: US 6,487,358 B1
(45) Date of Patent: Nov. 26, 2002

(54) BLANK MODULE WITH CONDUIT RETAINER

(75) Inventors: Gary Curtis Gehrke, San Jose, CA (US); Robert Alan Musetti, Cupertino, CA (US)

(73) Assignee: Ciena Corporation, Linthicum, MD (US)

( * ) Notice: Subject to any disclaimer, the term of this patent is extended or adjusted under 35 U.S.C. 154(b) by 0 days.

(21) Appl. No.: 09/915,405

(22) Filed: Jul. 27, 2001

(51) Int. Cl.[7] .............................. G02B 6/00; G02B 6/36
(52) U.S. Cl. ....................................... 385/136; 385/137
(58) Field of Search ................................ 385/135, 136, 385/137, 134; 361/651, 657

(56) References Cited

U.S. PATENT DOCUMENTS

| | | | | |
|---|---|---|---|---|
| RE34,955 E | * | 5/1995 | Anton et al. ................... | 385/53 |
| 5,835,660 A | * | 11/1998 | Jung et al. .................... | 385/137 |
| 6,266,471 B1 | * | 7/2001 | Burek et al. ................. | 385/137 |
| 6,292,371 B1 | * | 9/2001 | Toner, Jr. ..................... | 361/752 |
| 6,363,200 B1 | * | 3/2002 | Thompson et al. ......... | 385/135 |

* cited by examiner

*Primary Examiner*—Brian Sircus
*Assistant Examiner*—Michael C. Zarroli
(74) *Attorney, Agent, or Firm*—Michael R. Cammarata; James M. Olsen

(57) ABSTRACT

An optical module blank includes a base portion, and a pair of retainers disposed on the base portion. The pair of retainers retains conduits at a predetermined location of the base portion to enable the conduits to be connected to an optical component, such as a laser module, if the optical module blank is replaced with an optical module. A line module of an optical communications equipment may be populated with one or more optical module blanks. However, if the entire line module is to be totally populated with optical module blanks, then a line module blank may be used. Such a device includes a tray portion, and a retainer portion disposed on a front section of the tray portion. The retainer portion has abutting base plates with four pairs of retainers disposed on one base plate and another four pairs of retainers disposed on the other base plate. The pairs of retainers retain conduits at predetermined locations of the base plates to enable the conduits to be connected to optical components if the line module blank is replaced with a line module.

15 Claims, 3 Drawing Sheets

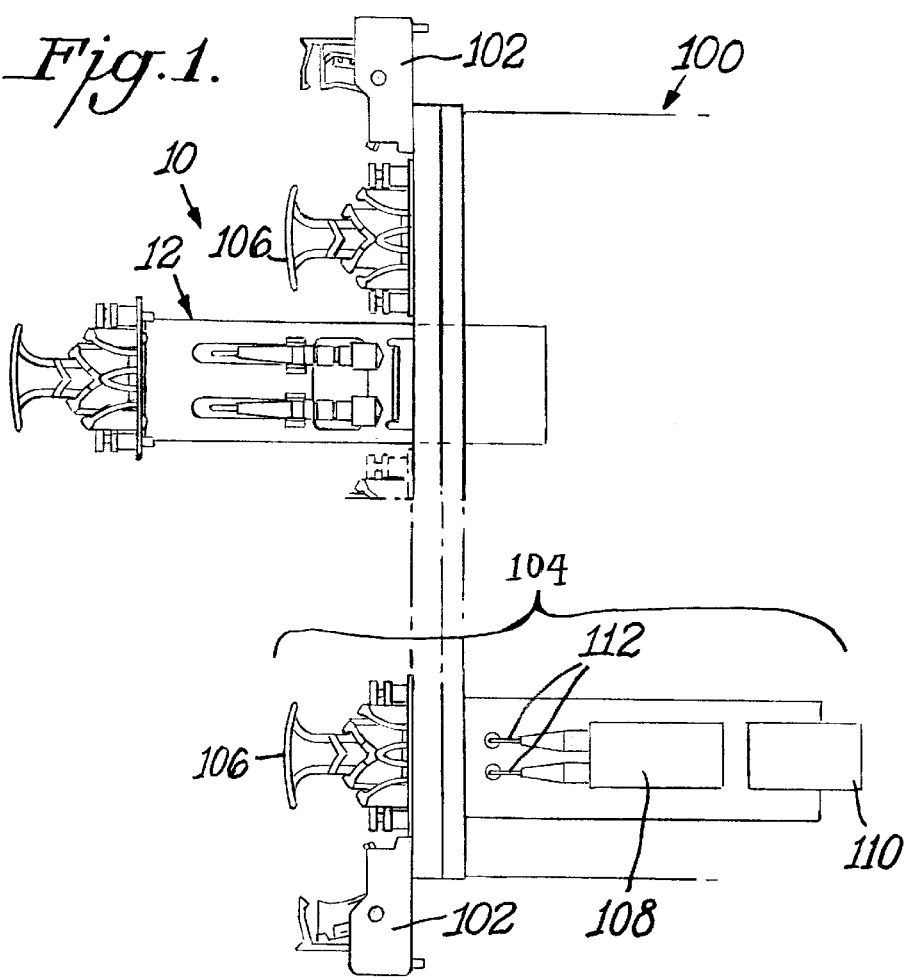
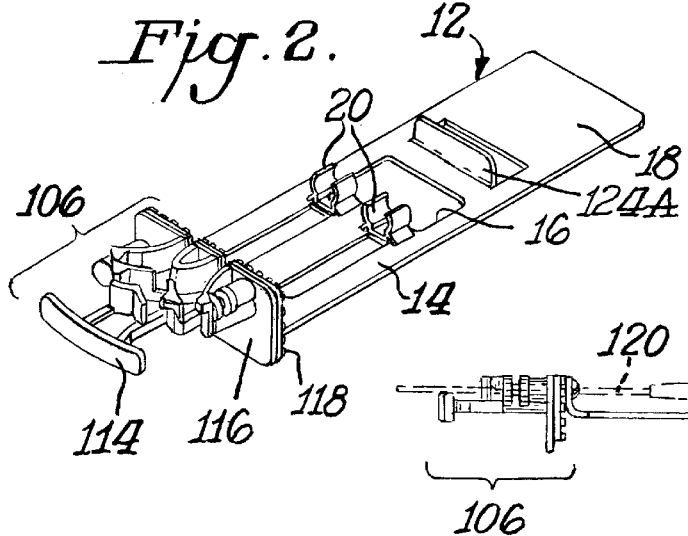

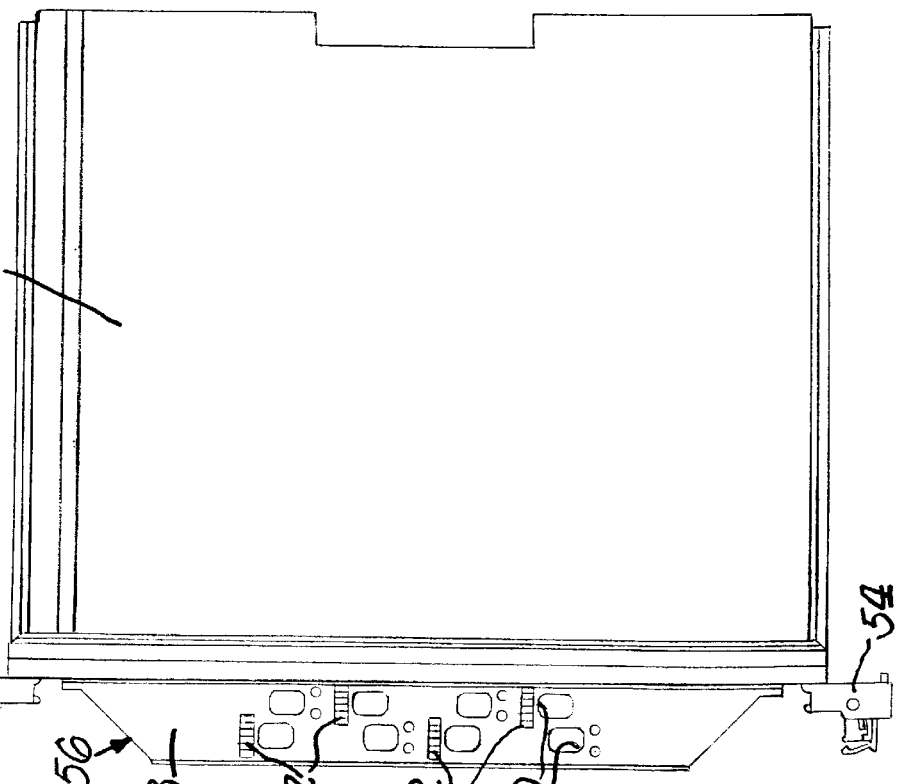
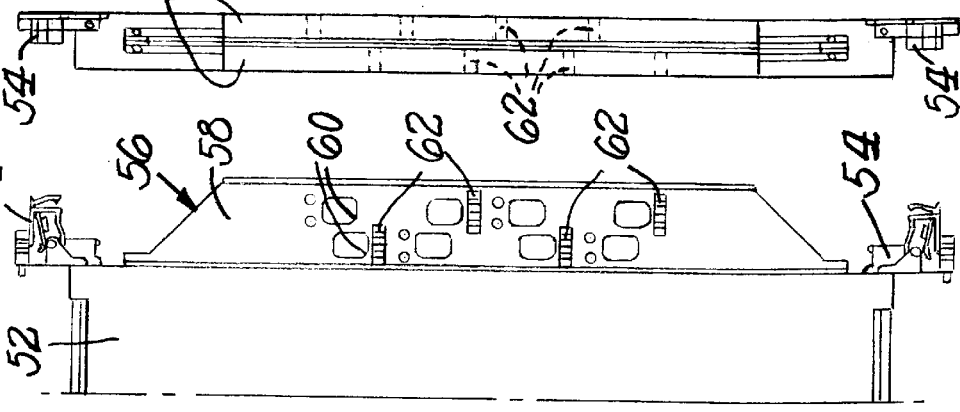
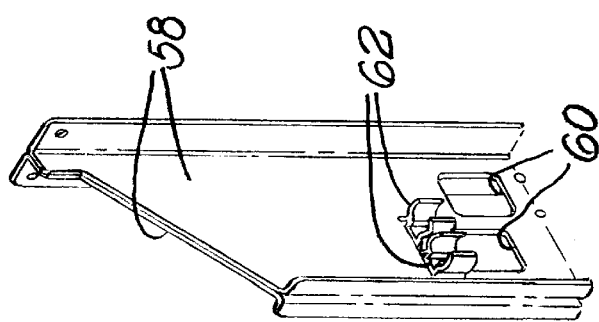

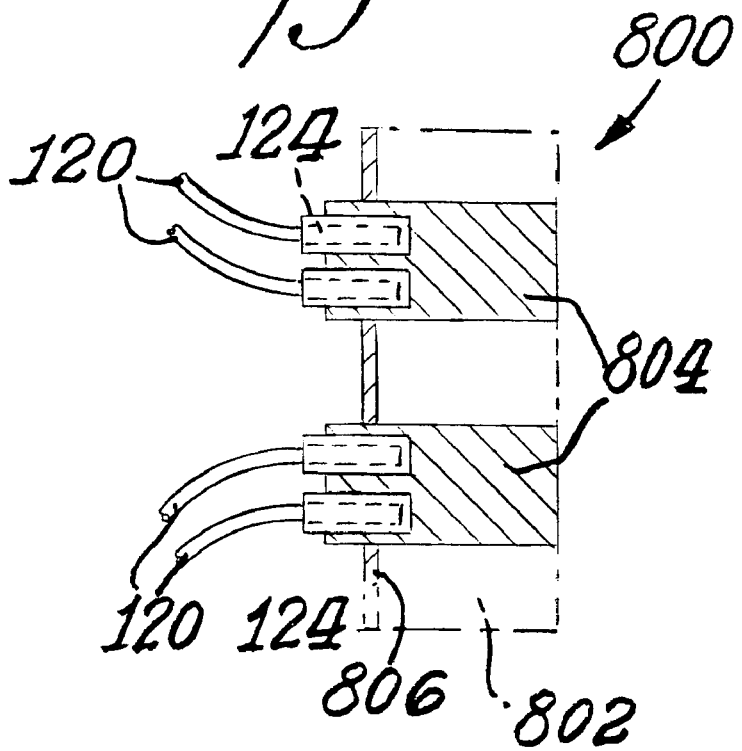

BLANK MODULE WITH CONDUIT RETAINER

BACKGROUND OF THE INVENTION

A. Field of the Invention

The present invention relates generally to the communications field, and, more particularly to a blank module with conduit retainer.

B. Description of the Related Art

Presently, it is a problem in the field of communication cable installation to ensure the precise placement of the communication cable without the possibility of damage or performance degradation to the communication cable by the provision of tight bends, or inappropriate use of fasteners, or inadequate support to the communication cable. Such communication cables include conventional telephone cable having a plurality of copper conductors, coaxial cable, optical fiber, or the like. In all of these applications, the minimum radius of curvature of the communication cable is well defined, and bending the communication cable in a tighter bend can cause damage to the communication medium housed within the cable. The installer of communication cable is thus faced with the problem of routing the communication cable over surfaces, which typically include sharp bends, without over bending the communication cable, yet also securing the communication cable to these surfaces in a manner to ensure protection from damage.

This problem is further heightened when fiber optic cables are used. Glass fibers used in such cables are easily damaged when bent too sharply and require observation of a minimum bend radius to operate within required performance specifications. The minimum bend radius of a fiber optic cable depends upon a variety of factors, including the signal handled by the fiber optic cable, the style of the fiber optic cable, and equipment to which fiber optic cable is connected.

Inappropriately routed and damaged fiber optic cables may lead to a reduction in the signal transmission quality of the cables. Accordingly, fiber optic cables are evaluated to determine their minimum bend radius. As long as a fiber optic cable is bent at a radius that is equal to or greater than the minimum bend radius, there should be no reduction in the transmission quality of the cable. If a fiber optic cable is bent at a radius below the minimum bend radius determined for such cable, there is a potential for a reduction in signal transmission quality through the bend. The greater a fiber optic cable is bent below its minimum bend radius, the greater the potential for breaking the fiber(s) contained in the cable.

Optical communication equipment is typically housed in bays, which include a rectangular frame having dimensions conforming to a particular standard, such as the Network Equipment Building Standard (NEBS). NEBS was originally developed by Bell Telephone Laboratories in the 1970s and expanded by Bellcore. Long a requirement for equipment used in the Central Office in the North American Public Switched Network, the NEBS criteria have become a universal measure of network product excellence.

NEBS covers a large range of requirements including criteria for personnel safety, protection of property, and operational continuity. NEBS covers both physical requirements including: space planning, temperature, humidity, fire, earthquake, vibration, transportation, acoustical, air quality and illumination; and electrical criteria including: electrostatic discharge (ESD), electromagnetic interference (EMI), lightning and AC power fault, steady state power induction, corrosion, DC potential difference, electrical safety and bonding and grounding. The term "electrostatic discharge" or "ESD", as used herein, refers to the rapid, spontaneous transfer of electrostatic charge induced by a high electrostatic field. Usually the charge flows through a spark (static discharge) between two bodies at different electrostatic potentials as they approach one another.

An optical communications equipment frame further typically has a plurality of shelves, each having one or more slots for accommodating circuit boards or cards that have optical and electrical components associated with a communication network mounted thereon. The components include, but are not necessarily limited to lasers, photodetectors, optical amplifiers, switching elements, add/drop multiplexers etc. In addition, fiber optic cables typically connect to one or more components.

One type of component used in optical communications equipment is a line module. A line module typically accommodates a circuit board or card, and a plurality of optical modules that have optical and electrical components mounted thereon. The line module has an opening for receiving the optical modules so that they may interconnect with the circuit board or card provided on the line module. A line module may also have components, normally contained on the optical modules, integrated directly into the line module. This type of line module has openings for optical interconnections, but no openings for optical modules.

Ideally, each shelf of an optical communications equipment frame will be fully populated with line modules with each line module fully populated with optical modules. However, the slots of each shelf typically are not fully populated, thereby resulting in the use of blank (dummy) line modules (alternatively called line module blanks) as well as with the use of blank (dummy) optical modules (alternatively called optical module blanks). Such blank modules are structurally configured the same way as modules, which contain electrical components, but specifically do not contain the typical electrical components found within the modules. These blank modules typically are used due to the equipment requirements of the user or the desire of the user is to leave room for future expansion of the communications system.

It also may be desirable to route all of the optical fibers (alternatively called fiber optic cables) to be used in a fully-populated communications equipment frame, even if line module blanks or partially populated line modules with optical module blanks are used, to thereby prevent over-handling and potentially damaging the fiber optic cables. Routing all of the fiber optic cables from the beginning also ensures that the cables will already be available when blank modules are replaced with true modules.

Currently in the installation process one of two events may occur, either the fiber optic cables are not provided for the unused port spaces in optical module blanks and line module blanks, or all the fiber optic cables are provided and the unused fiber optic cables are left to hang within the equipment frame. If the cables are not provided, then they need to be routed when additional components are installed in the equipment frame, increasing the potential damage that may be caused to over-handled existing fiber optic cables. If the fiber optic cables are provided and the unused fiber optic cables are hanging in the equipment frame, they may be damaged when line modules are moved in and out of adjacent slots in the equipment frame, or when the door to the equipment is opened or closed. Additionally, the installer needs to be able to verify that the fiber optic cables are of adequate length to reach the ports when optical modules are added.

The same holds true when other optical or electrical conduits are used. For example, during installation of electrical conduits, such as telephone cable having a plurality of copper conductors, coaxial cable, or the like, one of the two events discussed above may occur. As used herein, the term "conduit" refers to any electrical, optical, or other like media used to transmit and receive data or information from one point to another.

Thus, there is a need in the art to provide an inexpensive means for retaining conduits within a system, when blank modules are used, to permit an installer to route all of the desired conduits for a communications frame, to verify the conduits are routed to the correct length and to prevent the conduits from being damaged while they are stored within the frame.

SUMMARY OF THE INVENTION

The present invention solves the problems of the related art by providing blank modules that, when inserted within a slot of a bay (or shelf) of a communications system housing, allow an installer to route conduits within a communications frame to a desired length and have the conduits stored in a manner that is analogous to conduits that are used. This prevents the increased chance of the conduits being damaged from additional handling or inappropriate storage.

Further scope of applicability of the present invention will become apparent from the detailed description given hereinafter. However, it should be understood that the detailed description and specific examples, while indicating various embodiments of the invention, are given by way of illustration only, since various changes and modifications within the spirit and scope of the invention will become apparent to those skilled in the art from this detailed description. It is to be understood that both the foregoing general description and the following detailed description are exemplary and explanatory only and are not restrictive of the invention, as claimed.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a right side elevational view showing a line module populated with optical modules and a partially inserted optical module blank in accordance with an embodiment of the present invention;

FIG. 2 is an isometric view of the optical module blank shown in FIG. 1;

FIG. 3 is a right side elevational view of the optical module blank shown in FIGS. 1 and 2;

FIG. 4 is a front elevational view of a line module blank in accordance with another embodiment of the present invention;

FIG. 5 is a right side elevational view of the line module blank shown in FIG. 4;

FIG. 6 is a left side elevational view of the line module blank shown in FIGS. 4 and 5;

FIG. 7 is a partial isometric view of the line module blank shown in FIGS. 4–6; and FIG. 8 is a partial right side view of a line module blank having a transceivers provided through its faceplate in accordance with another embodiment of the present invention.

DETAILED DESCRIPTION OF EMBODIMENTS OF THE INVENTION

The following detailed description of embodiments of the present invention refer to the accompanying drawings. The same reference numbers in different drawings identify the same or similar elements. Also, the following detailed description does not limit the claimed invention. Instead, the scope of the invention is specifically defined by the appended claims and equivalents thereof.

The expression "optically communicates" as used herein refers to any connection, coupling, link or the like by which optical signals carried by one optical system element are imparted to the "communicating" element. Such "optically communicating" devices are not necessarily directly connected to one another and may be separated by intermediate optical components or devices.

Referring now specifically to the drawings, system 10 includes a line module 100 with a plurality of optical modules 104 and an optical module blank 12 according to an embodiment of the present invention as illustrated in FIG. 1. The system 10 has particular application in the telecommunications industry for managing the connection, routing, and distribution of optical signals to and from fiber optic cables. FIG. 1 shows a optical module blank 12 as it is being inserted in a line module 100 to be provided within a slot of an optical communications cabinet (not shown). Multiple line modules 100 may be installed in a cabinet with respective mounting brackets 102 used for mounting line modules 100 to support racks (not shown) of the optical communications cabinet. For illustrative purposes, only a single line module 100 is described below.

Line module 100 may include a plurality of optical modules 104 which are populated with optical and electrical components. Each optical module 104 may include a conduit (e.g., fiber optic cable) management tool 106, at least one laser module 108 that optically communicates with a corresponding photodetector module 110, and two conduits (e.g., fiber optic cables) 112 that connect to laser module 108. A further discussion of the management tool 106 is described in co-pending U.S. patent application Ser. No. 09/587,020 that was filed Jun. 5, 2000, the disclosure of which is herein incorporated by reference in its entirety.

Line module 100 also may include a plurality of optical module blanks 12 in accordance with an embodiment of the present invention. Although line module 100 of FIG. 1 only shows a few optical modules 104 and one optical module blank 12, line module 100 may have an application-specific number of optical modules 104 and optical module blanks 12, ranging from one to as many as will fit within line module 100. Furthermore, although FIG. 1 shows only two conduits being channeled through each of optical module 104 and optical module blank 12, more or less than two conduits may be channeled through each module 104 and optical module blank 12, depending upon the application for which line module 100 is being utilized.

Each optical module blank 12 preferably is the same, but alternatively may have different sizes and dimensions, depending upon the system application. Since in one embodiment each optical module blank 12 is preferably the same, reference will be made to a single optical module blank 12, but such description will also be equally applicable to any other type of optical module blanks 12 utilized in line module 100.

FIG. 2 illustrates an exemplary optical module blank 12 in greater detail. Optical module blank 12, for example, includes a conduit (e.g., fiber optic cable) management tool 106 as described in co-pending U.S. patent application Ser. No. 09/587,020. As described in the co-pending application, tool 106 comprises curved or arcuate portions that connect to a base portion 116, and a conductive portion 118.

Optical module blank 12 includes a base 14 that connects to fiber optic cable management tool 106 via a conventional connection mechanism, such as glue, adhesive, nuts and bolts, rivets, or screws. Base 14 includes an opening 16, and a portion 18 that extends base 14 so that that optical module blank 12 is the same length as an optical module. A pair of retainers 20 also is provided on base 12 at a location adjacent to opening 16. Opening 16 and retainers 20 together provide access and room to install and remove conduits without damage thereto. Retainers 20 may be integrally formed on base 14 or connected to base 14 with a conventional connection mechanism, such as glue, adhesive, nuts and bolts, rivets, or screws.

As shown in FIG. 3, conduits 120 are fed through conduit management tool 106, and sleeves or boots 122 of conduits 120 are received and retained (e.g., via frictional contact with) within retainers 20. Sleeves 122 protect conduits 120 from damage which may be caused by the retention of retainers 20. Retainers 20 receive and retain fiber optic cables 120 at a predetermined location set by stop tab 124A where the connectors 124 of the conduits 120 would be connected to laser module 108 within the optical module 104. Retainers 20 are placed at a location to ensure that conduits 120 will be long enough to later be cabled through optical module 104 and be connected onto laser module 108 when the optical module blank 12 eventually is replaced with optical module 104.

Thus, an installer may route conduits 120 into optical module blank 12, and then route the other ends of cables 120 to other portions of the system, which in this embodiment is an optical communication system. If an optical module 104 needs to be installed where an optical module blank 12 has been used, the installer need only remove the optical module blank 12 from line module 100, remove conduits 120 from retainers 20, insert conduits 120 into optical module 104, connect the conduits 120 to laser module 108 and insert optical module 104 into line module 100 in the location where the optical module blank 12 previously was present.

Retainers 20 may be made from a variety of materials and sizes, and may include clips, adhesive, Velcro® (registered trademark of Velcro Industries B.V. for its hook and loop fasteners), etc.

If a line module 100 having less than a fully-populated amount of optical modules 104 is desired, then optical module blanks 12 would populate line module 100 wherever optical modules 104 are not used. If a line module 100 having no optical modules 104 is desired, a line module blank, generally shown in FIGS. 4–7 as reference numeral 50, may be used. Line module blank 50 accomplishes the same purpose as the optical module blank 12, which is to ensure that the conduit 120 can be retained within the system 10 without having to handle the conduit 120 more than necessary.

Line module blank 50 includes a tray portion 52 that fits within a slot of an optical communications equipment shelf in the same way as a line module 100. Line module blank 50 further can include mounting brackets 54 connected to tray portion 52 and used for mounting line module blank 50 to support racks (not shown) of the optical communications cabinet. A retainer portion 56 extends perpendicular to and connects to a front section of tray portion 52. Retainer portion 56 may be integrally formed with tray portion 52, but preferably connects to tray portion 52 via a conventional connection mechanism, such as glue, adhesive, nuts and bolts, rivets, or screws.

Retainer portion 56 includes a pair of abutting base plates 58 having a plurality of openings 60 formed therein and a plurality of pairs of retainers 62 formed adjacent to openings 60. Openings 60 and retainers 62 together provide access and room to install and remove conduits without damage thereto. Each pair of retainers 62 may hold two conduits therein, and are configured the same way and made of the same material as retainers 20 described above. Retainer pairs 62 may be integrally formed on base plates 58 or connected to base plates 58 with a conventional connection mechanism, such as glue, adhesive, nuts and bolts, rivets, or screws.

As shown in FIGS. 5 and 6, four pairs of retainers 62 are provided on each base plate 58, such that sixteen conduits may be received and retained by retainer portion 54 of line module blank 50. The number of retainers may vary depending upon the application for which line module blank 50 is being utilized. Preferably, to avoid unnecessary congestion of the cabling of the conduits 120, half of the conduits 120 are provided from above retainer portion 56 and connect in the downward direction with the four pairs of retainers 62 formed on one base plate 58, while the other half of the conduits are provided from below retainer portion 56 and connect in the upward direction with the four pairs of retainers 62 formed on the abutting base plate 58.

The sleeves or boots of conduits are received and retained (e.g., via frictional contact with) within retainers 62. Retainers 62 receive and retain the conduits 120 at a location so that the connectors of the conduits may be provided and connected with an optical module that may subsequently be provided within a populated line module. Thus, an installer may route the conduits into line module blank 50, and then route the other ends of the conduits to other portions of the optical communications system. If a new optical module 104 needs to be installed in the system 10, then the installer need only remove line module blank 50, remove the conduits from retainers 62, insert a line module 100 into the system 110, insert one set of conduits 102 into optical module 104, insert the optical module 104 into line module 100 and connect the remaining unused conduits 102 into optical module blanks 12, which also are inserted into line module 100. The installer is able to perform such a task easily due to the retainers 62 being positioned in such a location that when conduits 120 are retained at the locations of the retainers 62, the conduits 120, which have been cabled through the system 10 and attached to the retainer, would be inherently measured to the appropriate length to allow the easy transfer from a line blank module.

In addition to optical module blank 12 and line module blank 50, the concepts discussed above with regard to the embodiments of the present invention may be used with an alternative embodiment of a line module blank, which positions the conduits 120 to be attached to a transceiver that is faceplate mounted. Such a faceplate-mounted transceiver line module is shown generally as reference numeral 800 in FIG. 8. In this embodiment, line module 800 having transceivers 806 mounted through its faceplate 806 is provided. This configuration differs from the arrangement described above where the transceivers (e.g., laser module 108) of optical module 104 were positioned within an optical module 104, which was internally positioned within the line module 100, away from the faceplate of line module 100. In this alternative embodiment, conduits 120 are connected to transceivers 804, which are positioned slightly raised from the faceplate of line module 100. Base on this alternative embodiment, the retainer arrangement shown in FIG. 5 would be used, but the retainers would be at different locations to accommodate for shorter cable lengths. The fiber optic cables would have shorter lengths since they do not extend into line module 100.

Yet another alternative embodiment could include different sets of retainers 62, which are positioned at different points on the line module blank 50 to enable an installer to configure the conduits 120 to different lengths depending upon the type of line module that is used in the system 10.

It will be apparent to those skilled in the art that various additional modifications and variations can be made in the various embodiments of the present invention and in construction of this system without departing from the scope or spirit of the present invention. For example, the embodiments of the present invention may be used for electrical-based modules rather than optical fiber-based modules, and thus, retain electrical cables rather fiber optic cables. Furthermore, the embodiments may retain different types of conduits, including but not limited to, fiber optic cable, telephone cable having a plurality of copper conductors, coaxial cable, or the like.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A blank module for a telecommunications system, comprising:
    a base; and
    at least one retainer disposed on said base at a first location to retain a conduit relative to said base, wherein the conduit is retained at a predetermined length that corresponds to the length of a conduit that connects with a component of a module that replaces the blank module in the telecommunications system.

2. The blank module as recited in claim 1, wherein the first location of said at least one retainer enables the conduit to connect to the component with minimal strain on the conduit.

3. The blank module as recited in claim 1, wherein the blank module comprises a line module blank.

4. The blank module as recited in claim 1, wherein the blank module comprises a line module blank.

5. The blank module as recited in claim 1, wherein the blank module comprises an optical module blank.

6. The blank module as recited in claim 1, wherein the module comprises an optical module, and the component comprises an optical transceiver provided on the optical module.

7. The blank module as recited in claim 6, wherein the predetermined length of the conduit is the length that connects the conduit to the optical transceiver of the optical module.

8. The blank module as recited in claim 1, wherein the module comprises a line module, and the component comprises an optical transceiver provided within the line module.

9. The blank module as recited in claim 8, wherein the predetermined length of the conduit is the length that connects the conduit to the optical transceiver of the line module.

10. The blank module as recited in claim 1, wherein the module comprises a line module, and the component comprises an optical transceiver provided through a faceplate of the line module.

11. The blank module as recited in claim 10, wherein the predetermined length of the conduit is the length that connects the conduit to the optical transceiver provided through the faceplate of the line module.

12. A line module for a telecommunications system, comprising:
    a tray having a faceplate with an opening provided therethrough;
    an optical module blank provided through the opening of the faceplate, said optical module blank having a retainer disposed on a base at a first location to retain a conduit relative to the base, wherein the conduit is retained at a predetermined length that corresponds to the length of a conduit that connects with a component of an optical module that replaces the optical module blank in the telecommunications system.

13. A line module as recited in claim 12, wherein the first location the retainer enables the conduit to connect to the component with minimal strain on the conduit.

14. A line module as recited in claim 12, wherein the component comprises an optical transceiver provided on the optical module.

15. A line module as recited in claim 14, wherein the predetermined length of the conduit is the length that connects the conduit to the optical transceiver of the optical module.

* * * * *

UNITED STATES PATENT AND TRADEMARK OFFICE
CERTIFICATE OF CORRECTION

PATENT NO.     : 6,487,358 B1
DATED          : November 26, 2002
INVENTOR(S)    : Gary Curtis Gehrke and Robert Alan Musetti It is certified that error appears in the above-identified patent and that said Letters Patent is hereby corrected as shown below:

Column 7,
Lines 50-51, claim 4 which recites "4. The blank module as recited in claim 1, wherein the blank module comprises a line module blank." should be deleted.

Signed and Sealed this

Sixth Day of May, 2003

JAMES E. ROGAN
*Director of the United States Patent and Trademark Office*